United States Patent [19]

Dauberger

[11] Patent Number: 5,031,789
[45] Date of Patent: Jul. 16, 1991

[54] STANDOFF FOR OUTLET BOXES

[75] Inventor: George R. Dauberger, Memphis, Tenn.

[73] Assignee: FL Industries, Inc., Memphis, Tenn.

[21] Appl. No.: 508,661

[22] Filed: Apr. 13, 1990

[51] Int. Cl.$^5$ .............................................. H02G 3/00
[52] U.S. Cl. ................................................... 220/3.9
[58] Field of Search ................................ 220/3.4, 3.9; 248/DIG. 6

[56] References Cited

U.S. PATENT DOCUMENTS

| | | | |
|---|---|---|---|
| 1,774,934 | 9/1930 | Mangin | 220/3.92 |
| 1,795,224 | 3/1931 | Mangin | 220/3.4 |
| 2,432,555 | 12/1947 | Smith | 220/3.9 X |
| 3,448,884 | 6/1969 | Swanquist et al. | 220/3.9 |
| 3,474,994 | 10/1969 | Swanquist | 248/205 |
| 3,767,151 | 10/1973 | Seal et al. | 248/205 R |
| 3,972,498 | 8/1976 | Paskert | 220/3.9 X |
| 4,057,164 | 11/1977 | Maier | 220/3.6 |
| 4,399,922 | 8/1983 | Horsley | 220/3.6 |
| 4,645,089 | 2/1987 | Horsley | 220/3.6 |
| 4,732,356 | 3/1988 | Medlin, Sr. | 248/27.1 |

Primary Examiner—Steven M. Pollard
Attorney, Agent, or Firm—Jones, Day, Reavis & Pogue

[57] ABSTRACT

A standoff attached to an outlet box on the opposite side thereof from a wall stud on which the box is mounted. The box has an open front located adjacent an opening in wallboard attached to one side of the wall stud. The standoff projects rearwardly of the box for engaging the inner surface of wallboard attached to the opposite side of the wall stud for preventing rearward movement of the box. The standoff has selectively frangible portions for adapting it for use with outlet boxes and wall studs of different depths.

22 Claims, 2 Drawing Sheets

STANDOFF FOR OUTLET BOXES

BACKGROUND OF THE INVENTION

This application relates to the art of braces and supports and, more particularly, to a standoff for bracing an unattached side of an electrical outlet box against rearward movement. The invention is particularly applicable for use with outlet boxes attached to metal wall studs and will be described with particular reference thereto. However, it will be appreciated that the invention has broader aspects and can be used in other environments.

Metal wall studs, and brackets used for attaching electrical outlet boxes thereto, are not completely rigid, and sometimes allow rearward movement of the unattached side of the box. Standoffs have been devised for attachment to a box on the opposite side thereof from the wall stud to which it is mounted. Known standoffs of this type are usable on only one size of outlet box and wall stud. It would be desirable to have a universal standoff that could be used on outlet boxes and wall studs of different depths.

SUMMARY OF THE INVENTION

An elongated standoff of the type described includes opposite end portions, and primary attaching means is provided on one of such end portions for attachment to an outlet box sidewall adjacent the open front of the box. Secondary attaching means is provided intermediate the opposite end portions for attachment to the rear of the outlet box.

In a preferred arrangement, the secondary attaching means includes a plurality of secondary attaching means spaced-apart from one another longitudinally of the standoff intermediate its opposite end portions.

The secondary attaching means is in the form of resilient fingers extending transversely of the standoff for resiliently gripping the rear of an outlet box. Frangible means is provided for facilitating removal of the resilient fingers located closest to the end portion of the standoff having the primary attaching means thereon. This allows use of the other resilient finger on an outlet box having a greater depth.

The secondary attaching means located closest to the primary attaching means may be in the form of a pair of resilient fingers extending transversely outwardly from the standoff adjacent opposite side edges thereof. The other secondary attaching means may comprise a single resilient finger centered on the longitudinal axis of the standoff.

The standoff includes an extension portion extending rearwardly of the secondary attaching means. Frangible means is provided on the standoff for facilitating removal of the extension portion to allow use of the standoff with wall studs having different depths.

The standoff is preferably a substantially flat member made of steel, and has a transversely extending support foot on the other of its opposite end portions. The foot extends transversely outwardly from the standoff on the opposite side thereof from the primary attaching means.

The standoff has a stiffening rib extending therealong between the primary and secondary attaching means for inhibiting bending of the standoff, particularly when separable parts are removed by bending same along the frangible means.

The resilient fingers defining the secondary attaching means are inclined outwardly from the standoff toward the end portion thereof having the primary attaching means thereon. The terminal end portions of the resilient fingers are reversely inclined back toward the other of the opposite end portions of the standoff.

It is a principal object of the present invention to provide an improved standoff for bracing electrical outlet boxes.

It is another object of the invention to provide such a standoff that can be modified for use on boxes having different depths.

It is a further object of the invention to provide such a standoff that can be modified for use with wall studs having different depths.

It is also an object of the invention to provide such a standoff that is economical to manufacture and simple to install.

DESCRIPTION OF A PREFERRED EMBODIMENT

Figure 1:
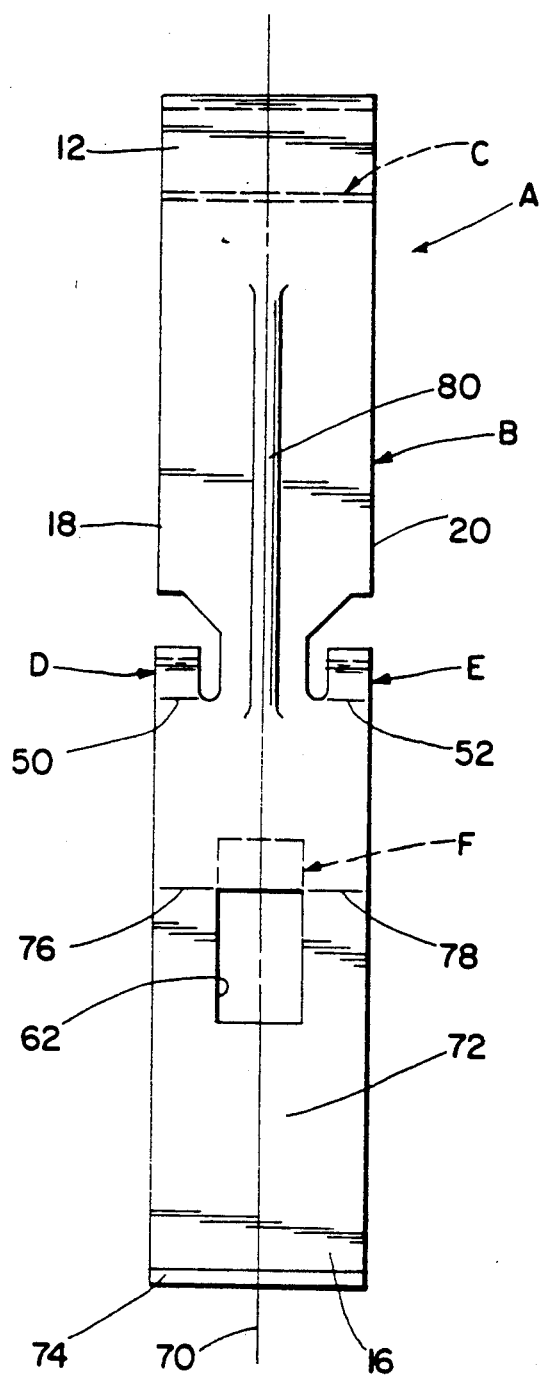
FIG. 1 is an elevational view of a standoff constructed in accordance with the present application.

Referring now to the drawings, wherein the showings are for purposes of illustrating a preferred embodiment of the invention only and not for purposes of limiting same, the drawings show an elongated standoff A in the form of a substantially flat elongated member B having opposite end portions generally indicated at 12, 16 and opposite side edges 18, 20.

Primary attaching means C is provided on one end portion 12 of elongated member B. Primary attaching means C includes a transversely extending portion 22 that also defines engagement means for engaging the front end of an outlet box sidewall adjacent to the open front of the box. Transverse portion 22 of primary attaching means C merges into a reversely extending portion 24 that extends back along elongated member B and is also inclined back toward same. Reversely extending portion 24 merges into an outwardly extending terminal portion 26.

The inner intersection 30 between reversely extending portion 24 and terminal portion 26 is spaced outwardly from the facing surface of elongated member B a distance less than the thickness of an outlet box sidewall. Therefore, when an outlet box sidewall is inserted into primary attaching means C, the box sidewall is tightly gripped between the surface of intersection 30 and the opposite facing surface of elongated member B. The front end of the outlet box sidewall engages the inner surface of transverse portion 22 of primary attaching means C.

Secondary attaching means for attachment to the rear of an outlet box is defined by a pair of transversely spaced-apart and transversely aligned resilient fingers D, E, and a single resilient finger F. The pair of resilient fingers D, E are bent transversely outwardly from elongated flat member B along opposite side edges 18, 20 thereof. All of fingers D, E and F extend transversely outwardly from flat member B on the same side thereof as primary attaching means C.

Each finger D, E includes an inclined portion 34 that is inclined back toward end portion 12 and primary attaching means C. Inclined portion 34 merges into a terminal finger portion 36 that is reversely inclined back toward end portion 6. Inclined portion 34 and terminal portion 36 have an intersecting surface 40 that is engagable with the rear of an outlet box for resiliently gripping same.

The distance between the inner surface of transverse portion 22 on primary attaching means C and finger intersecting surface 40 is slightly less than the distance from the front end of a box sidewall to the rear of the box. Thus, when a box sidewall is received in primary attaching means C with the front end of the sidewall engaging the inner surface of transverse portion 22, fingers D, E will be resiliently stressed and bent rearwardly for gripping the rear of the box at finger intersections 40.

Finger frangible means in the form of score lines or weakening lines 50, 52 are provided for facilitating removal of resilient fingers D, E from elongated flat member B. Frangible means 50, 52 is formed on the flat surface of elongated member B on the opposite side thereof from fingers D, E. Gripping of fingers D, E in the jaws of a pliers and bending same allows complete separation thereof from flat member B along score lines 50, 52.

Figure 2:
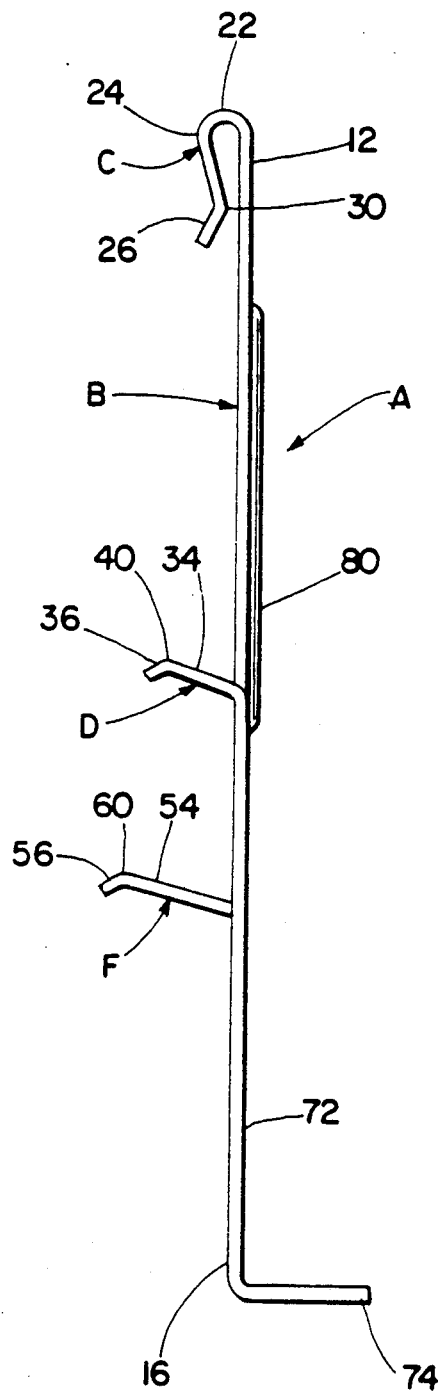
FIG. 2 is a side elevational view of the standoff of FIG. 1.

Secondary finger F includes an inclined portion 54 that is inclined back toward end portion 12 and primary attaching means C. Inclined portion 54 merges into a terminal portion 56 that is reversely bent back toward end portion 16 of elongated member B. Inclined portion 54 and terminal portion 56 have an intersecting surface 60 for engaging the rear of an outlet box. Opening 62 in FIG. 1 is formed when finger F of FIG. 2 is stamped from flat member B. Finger F is substantially centered on longitudinal centerline 70 of elongated member B. When resilient fingers D, E are removed from elongated member B, resilient finger F will resiliently grip the rear of an outlet box having a greater depth.

Elongated member B includes a rear extension portion 72 having a transversely extending foot 74 on end portion 16 thereof. Foot 74 extends transversely outwardly from elongated member B on the opposite side thereof from primary attaching means C. Extension portion frangible means in the form of score lines or weakening lines 76, 78 extend transversely across elongated member B on the surface thereof opposite from finger F. Frangible means 76, 78 facilitates removal of extension portion 72 from elongated member B.

Score lines 76, 78 are located such that when extension portion 72 is removed, resilient finger F remains on elongated member B instead of being removed therefrom along with extension portion 72. Thus, score lines 76, 78 are located closely adjacent the secondary attaching means defined by resilient finger F, but on the opposite side thereof from primary attaching means C. Strictly by way of example, and not by way of limitation, where the overall length of standoff B is about 3-13/32", score lines 76, 78 are about 2-9/32" from the terminal end of end portion 12.

A centrally located elongated stiffening rib 80 is formed in elongated member B between primary attaching means C and secondary attaching means D, E. Stiffening rib 80 is centrally located between opposite side edges 18, 20 of elongated member B and extends past resilient fingers D, E. Stiffening rib 80 is formed on the opposite side of elongated member B from which fingers D, E and F extend. Stiffening rib 80 inhibits deformation of elongated member B when fingers D, E or extension portion 72 are removed therefrom.

By way of example, primary attaching means C and secondary attaching means D, E are used on an outlet box having a depth of approximately 1½". When secondary attaching means D, E are removed, primary attaching means C and secondary attaching means F are used on an outlet box approximately 2⅛" deep. Extension portion 72 is left on elongated member B when it is used with a box attached to metal wall studs having a depth of 3⅝" or 4". When the box is attached to metal wall studs having a depth of approximate 2½", extension portion 72 is removed from elongated member B.

Figure 4:
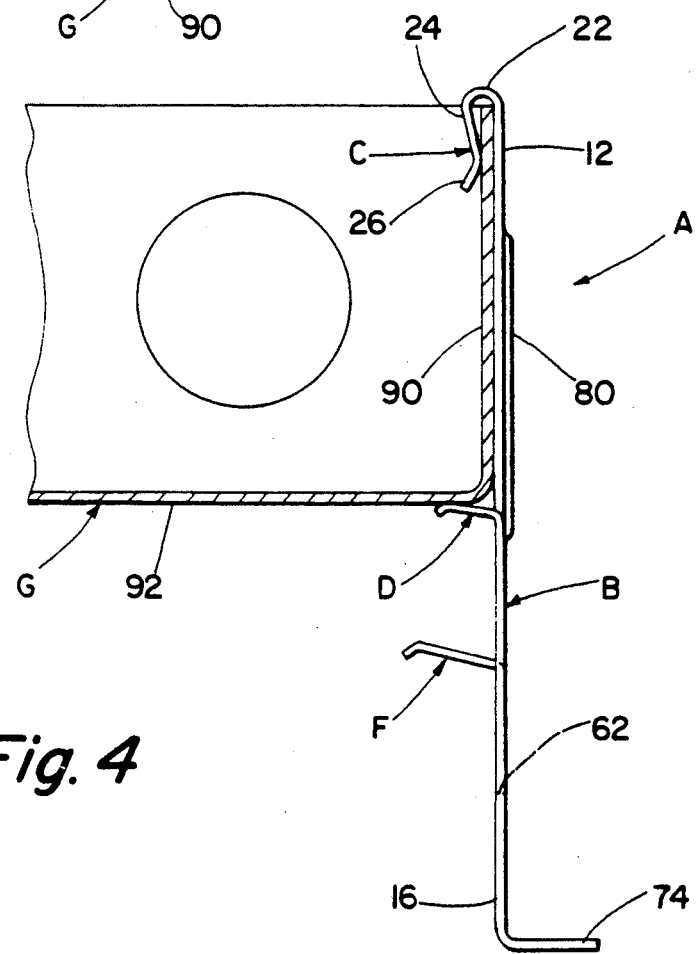
FIG. 4 is a side elevational view showing the standoff attached to a sidewall of an outlet box.

FIG. 4 shows a portion of a metal electrical outlet box G having a sidewall 90 and a rear wall 92. The front end portion of box sidewall 90 adjacent the open front of box G is received in, and resiliently gripped by, primary attaching means C. The secondary attaching means defined by resilient fingers D, E are resiliently deformed back toward end portion 16 and resiliently grip outlet box rear wall 92. For an outlet box having a greater depth, resilient fingers D, E are removed and resilient finger F will resiliently grip the rear wall of the other box.

Figure 3:
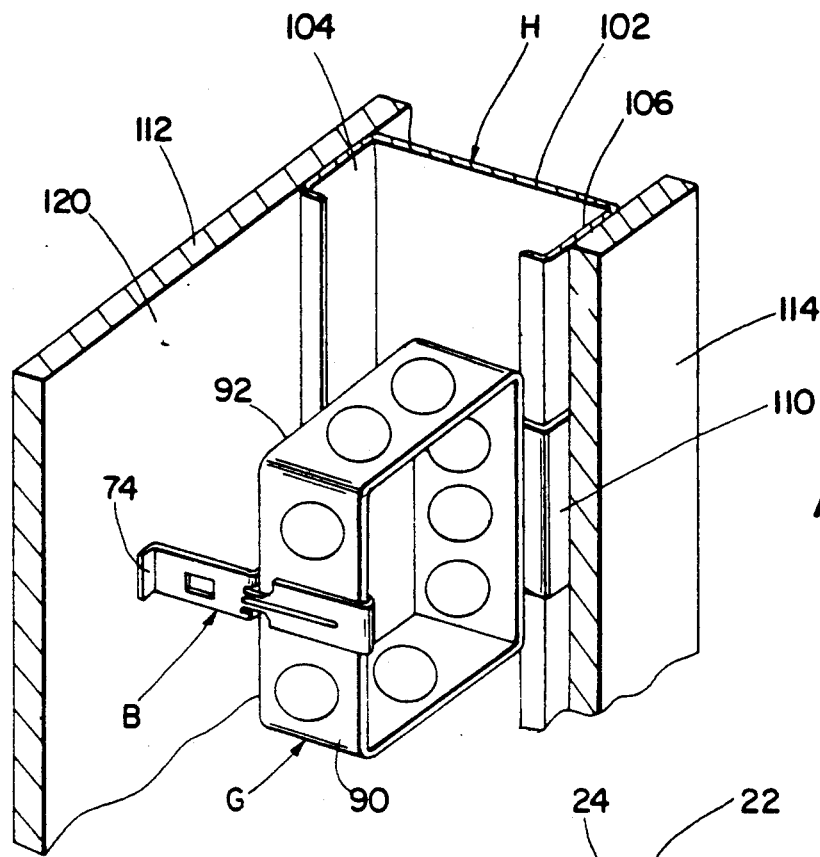
FIG. 3 is a perspective illustration showing the standoff installed on an outlet box mounted to a metal wall stud having wallboards secured to the opposite sides thereof.

FIG. 3 shows a conventional channel-shaped metal wall stud H having a central web 102 and opposite flanges 104, 106. Outlet box G has a conventional bracket 110 attached thereto and the bracket itself is attached to flange 106 of wall stud H. Wallboard 112, 114 is attached to flanges 104, 106 of stud H. Outlet box G is positioned in the space between wallboard 112, 114, and the open front of the box is accessible through a suitable opening formed in wallboard 114. Outlet box sidewall 90 is located opposite from the side of the box that is mounted to wall stud H, and the box is normally unsupported adjacent sidewall 90. The rear end of the standoff of the present application is adapted to engage the inner surface 120 of wallboard 112 for inhibiting rearward movement of outlet box G toward wallboard 112.

The improved universal standoff of the present application provides a single standoff that can be modified by installers for use on outlet boxes and wall studs of different depths. For purposes of description, fingers D, E may be considered initial secondary attaching means, and finger F to be a terminal secondary attaching means.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A standoff for electrical outlet boxes comprising an elongated member having opposite end portions, said elongated member being substantially flat and straight between said opposite end portions, primary attaching means on one of said end portions for attachment to a sidewall of an outlet box adjacent an open front thereof with said elongated member extending along the box sidewall and with the other of said opposite end portions spaced a substantial distance beyond the bottom of the box, and secondary attaching means on said elongated member intermediate said opposite end portions thereof for attachment to the rear of an outlet box adjacent the box sidewall along which said elongated member extends, said secondary attaching means comprising resilient finger means extending transversely outwardly from said elongated member intermediate said opposite end portions thereof and on the same side thereof as said primary attaching means for engaging the rear of an outlet box, said primary attaching means and said resilient finger means being spaced from one another a distance slightly less than the depth of an outlet box for resiliently gripping of a box from front-to-rear between said primary attaching means and said resilient finger means.

2. The standoff of claim 1 wherein said secondary attaching means comprises a plurality of secondary attaching means spaced-apart from one another between said opposite end portions for attachment to the rear of outlet boxes having different depths.

3. The standoff of claim 1 including frangible means between said secondary attaching means and said elongated member for facilitating separation of said secondary attaching means from said elongated member.

4. The standoff of claim 1 wherein said elongated member has an extension portion on the opposite side of said secondary attaching means from said primary attaching means, and frangible means on said elongated member for facilitating separation of said extension portion therefrom.

5. The standoff of claim 1 wherein said resilient finger is inclined toward said one end portion of said elongated member.

6. The standoff of claim 5 wherein said resilient finger includes a first finger portion extending outwardly from said elongated member at an inclination toward said one end portion of said elongated member, said finger having a terminal finger portion inclined toward the other of said end portions from said first finger portion.

7. The standoff of claim 6 wherein said first finger portion is substantially larger than said terminal finger portion.

8. The standoff of claim 1 wherein said secondary attaching means includes a plurality of secondary attaching means spaced-apart form one another intermediate said opposite end portions of said elongated member and including initial secondary attaching means located closest to said primary attaching means, and frangible means between said elongated member and said initial secondary attaching means for facilitating separation of said initial secondary attaching means from said elongated member.

9. The standoff of claim 8 wherein said secondary attaching means includes a terminal secondary attaching means located closest to the other of said opposite end portions of said elongated member, said elongated member having an extension portion extending between said terminal secondary attaching means and said other end portion of said elongated member, and frangible means on said elongated member adjacent said terminal secondary attaching means for facilitating separation of said extension portion from said elongated member.

10. A standoff for electrical outlet boxes comprising an elongated generally flat member having opposite end portions, attaching means on one of said end portions for attachment to an outlet box sidewall adjacent an open front of the box, resilient finger means extending transversely outwardly from said elongated member intermediate said opposite end portions thereof and on the same side as said attaching means for engaging the rear of an outlet box, said attaching means and said resilient finger means being spaced from one another a distance slightly less than the depth of an outlet box for resiliently gripping of a box from front-to-rear between said attaching means and said resilient finger means, said flat member having an extension portion that includes the other of said opposite end portions for extending rearwardly of an outlet box, frangible means extending across said flat member for facilitating separation of said extension portion from said flat member, and said frangible means being located substantially closer to said other of said opposite end portions than to said one of said opposite end portions, the length of said flat member with said extension portion corresponding to one side of wall stud and the length of said flat member with said extending portion removed therefrom corresponding to a different wall stud size.

11. The standoff of claim 10 including secondary attaching means extending outwardly from said flat member for attachment to the rear of an outlet box.

12. The standoff of claim 11 wherein said secondary attaching means is located closely adjacent said frangible means and on the opposite side of said frangible means from said extension portion so that said secondary attaching means remains on said flat member when said extension portion is removed therefrom.

13. The standoff of claim 11 wherein said flat member has opposite side edges and said secondary attaching means is substantially centrally located between said opposite side edges.

14. The standoff of claim 11 wherein said other of said opposite end portions includes a foot extending outwardly from said flat member transversely thereof, and said secondary attaching means and said foot extend outwardly from said flat member on opposite side thereof.

15. A standoff for electrical outlet boxes comprising an elongated member having opposite end portions, attaching means on one of said end portions for attachment to a sidewall of an outlet box adjacent an open front thereof, said attaching means including engaging means extending transversely of said elongated member for engaging a front end of a box sidewall, resilient finger means extending transversely outwardly from said elongated member intermediate said opposite end portions thereof and on the same side thereof as said engaging means for engaging the rear of an outlet box, said engaging means and said resilient finger means being spaced from one another a distance slightly less than the depth of an outlet box for resilient gripping of a box from front-to-rear between said engaging means and said resilient finger means, said elongated member having an extension portion extending between said resilient finger means and the other of said opposite end portions, said extension portion being a substantially flat and straight continuation of said elongated member that projects rearwardly of the box to which said elongated member is attached.

16. The standoff of claim 15 wherein said elongated member is substantially flat and has opposite side edges, said resilient finger means comprising a pair of resilient fingers deformed outwardly from said elongated member along said side edges.

17. The standoff of claim 15 wherein said elongated member is substantially flat and includes stiffening rib means extending longitudinally thereof for stiffening same against bending.

18. The standoff of claim 17 wherein said stiffening rib means extends only between said attaching means and said resilient finger means.

19. The standoff of claim 15 wherein said resilient finger means includes a plurality of resilient fingers spaced-apart longitudinally of said elongated member.

20. The standoff of claim 19 wherein said elongated member is substantially flat and has opposite side edges, said resilient fingers including a pair of transversely aligned resilient fingers deformed outwardly from said elongated member along said side edges, and an individual resilient finger spaced from said pair of resilient fingers on the opposite sides thereof from said attaching means.

21. The standoff of claim 20 including finger frangible means for facilitating separation of said pair of fingers from said elongated member.

22. The standoff of claim 21 including extension portion frangible means extending transversely across said elongated member adjacent said individual resilient finger for facilitating removal of said extension portion from said elongated member.

* * * * *